United States Patent [19]
Johnson, Jr. et al.

[11] 3,792,709
[45] Feb. 19, 1974

[54] SPREAD RATE CONTROLLER

[75] Inventors: Theodore E. Johnson, Jr., South Hamilton; Edward W. Dahn, Chelmsford, both of Mass.

[73] Assignee: Comdell, Inc., Beverly, Mass.

[22] Filed: Aug. 21, 1972

[21] Appl. No.: 282,557

[52] U.S. Cl.................... 137/47, 137/49, 222/178, 239/156, 239/677
[51] Int. Cl............................................. B05b 9/06
[58] Field of Search 137/47, 49, 351; 239/155, 156, 239/677; 222/178

[56] References Cited
UNITED STATES PATENTS

| | | | |
|---|---|---|---|
| 3,677,540 | 7/1972 | Weiss | 239/677 X |
| 3,679,098 | 7/1972 | Weiss | 239/677 X |
| 3,344,993 | 10/1967 | Wilder et al. | 239/677 X |
| 3,550,866 | 12/1970 | Swenson | 239/677 |
| 3,693,838 | 3/1970 | Haker et al. | 239/155 X |

Primary Examiner—Robert G. Nilson
Attorney, Agent, or Firm—Thomas N. Tarrant

[57] ABSTRACT

Apparatus for sensing the rotational speed of a shaft and positioning a control device in a position predetermined relative to the speed of the shaft, the apparatus being particularly suited for the operation of mobile spreading equipment in which the spreading rate is controlled relative to the drive shaft speed of the vehicle. The controller converts the rotational speed of the shaft and the position of the control device to comparable electrical signals which are then compared to produce a resultant to effect further positioning of the control device. Both linear and nonlinear weighting is applied to produce the desired function in the resultant.

7 Claims, 3 Drawing Figures

SPREAD RATE CONTROLLER

BACKGROUND OF THE INVENTION

1. Field of the Invention

The present invention relates to spread rate controllers for controlling the spreading of salt, sand, gravel, fertilizer and the like from moving vehicles.

2. Description of the Prior Art

Salt-spreading trucks used to combat slippery roads in winter, conventionally operate the spreading machinery hydraulically. The truck driver has hydraulic control valves mounted within operating reach for starting, stopping and controlling the spreading rate. Some automation has been provided in the past, usually of a straightforward mechanical nature, to control the spreading rate as a linear function of vehicle speed. Manual override is a constant necessity since the distribution of salt and sand on slippery roads is most desirably increased for hills, curves and intersections. Thus, at open road speeds the distribution should be proportional to vehicle speed, but when slowing for curves, hills or intersections, a disproportionate distribution is desired. It is also a frequent necessity for salt or sand spreading trucks to back up on hills since they are unable to get adequate traction without spreading salt and/or sand first. Prior automated controls conventionally are operative in the forward direction only.

SUMMARY OF THE INVENTION

Now, in accordance with the present invention, an electrical system has been found for detecting the rotational speed of one shaft and comparing it with the rotational position of a control shaft and then driving the control shaft by either a linear or non-linear function of the rotational speed of the one shaft. It has further been found that the rotational speed of the one shaft is readily detected as a train of electrical pulses and a voltage level indicative of the repetition rate of those pulses can be obtained by continuously charging a capacitor and clamping the capacitor to a fixed reference level by each pulse of the train of pulses. The charge level or the capacitor immediately prior to clamping is then utilized as an indicative voltage level. Linearity controls applied to the capacitor charging circuit provide the linear and nonlinear functions. This electrical system has been found to provide a new useful combination in spreading equipment for road and farm vehicles in which the drive shaft speed is compared with the position of a hydraulic control valve to provide the dispersal rate of salt, sand, fertilizer or the like. The ability of the system to provide relatively heavy dispersal at slow speeds with a nonlinear transition to dispersal substantially proportional to speed at higher speeds is believed to be unique. This system is also fully operative for both forward and reverse directions of a spreading vehicle.

Thus it is an object of the invention to provide means for controlling the position of a control device as a function of the rotational speed of a shaft.

It is a further object of the invention to provide means for controlling the position of a control device as a complex function of the rotational speed of a shaft.

It is a further object of the invention to provide a spread rate controller for controlling the spreading rate of salt, sand, fertilizer and the like from a moving vehicle as a complex function of the speed of motion.

It is a further object of the invention to provide a voltage level signal indicative of the repetition rate of a train of pulses by continuously charging a capacitor, detecting the near peak voltage on said capacitor and clamping said capacitor to reference level by each pulse of said train.

Further objects and features of the invention will become apparent upon reading the following description together with the drawing.

DESCRIPTION OF A PREFERRED EMBODIMENT

Figure 1:
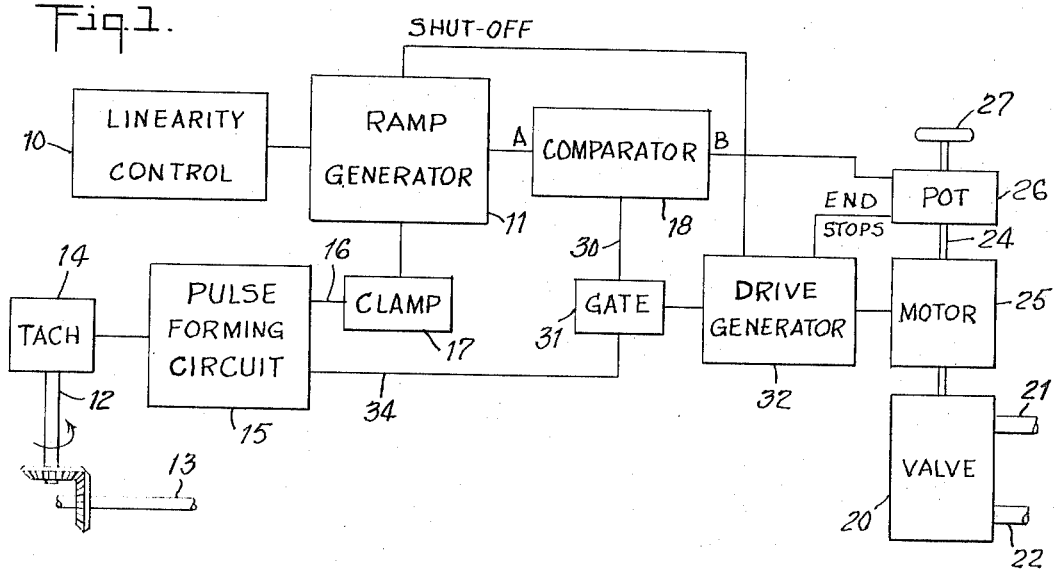
FIG. 1 is a block diagram of a spread rate controller according to the invention.

Both digital and analog versions of a spread rate controller have been built. The substantially analog version is the preferred embodiment described here. In both versions the control function curve variables were introduced by weighting the signals derived from rotational shaft speed. In the digital version these variables were introduced by weighting the count in a digital counter. In FIG. 1, linearity control 10 on ramp generator 11 provides the variables for complex function curves.

The rotational speed of shaft 12 is detected by tachometer 14. Tachometer 14 is suitably a magnetic pulse type in which relative motion between magnetic pole pieces generates a train of electrical pulses.

Pulse forming circuit 15 is used to provide consistent pulse shape of a predetermined length. One-shot multivibrator circuits are suitable for this purpose. Pulse forming circuit 15 has a first output 16 to clamp 17. Clamp 17 is connected to ramp generator 11. Clamp 17, ramp generator 11 and linearity control 10 will be described in greater detail with reference to FIG. 2. The output of ramp generator 11 is connected as input A of comparator 18.

Approaching comparator 18 from the other side, a control device is depicted as hydraulic valve 20. Hydraulic valve 20 has an input hydraulic connection 21 and an output hydraulic connection 22. Control shaft 24 for valve 20 is depicted as extending through and connecting with motor 25 and potentiometer 26. Manual knob 27 also connects to shaft 24 for use in breakdowns or other emergencies. Potentiometer 26 detects the operative position of valve 20 as an analog voltage which is provided as input B to comparator 18.

Comparator 18 can be any of many known types. It suitably provides a different output signal for each of three input conditions: A>B; B>A; and A≈B. These output signals can be on separate output lines or the same output line, depending on the configuration of comparator 18 and the drive generator 32. Since in the depicted embodiment, input A will be almost a sawtooth in shape, output 30 of comparator 18 will be erratic. Consequently, gating is necessary and is depicted by gate 31 connected between comparator 18 and drive generator 32. Second output 34 of circuit 15 provides an enable signal to gate 31 at a time immediately preceding the effect of triggering clamp 17. Thus the comparisons that are seen by drive generator 32 are based on near peaks of ramp generator 11. Drive generator 32 is described in greater detail with reference to FIG. 3.

Figure 2:
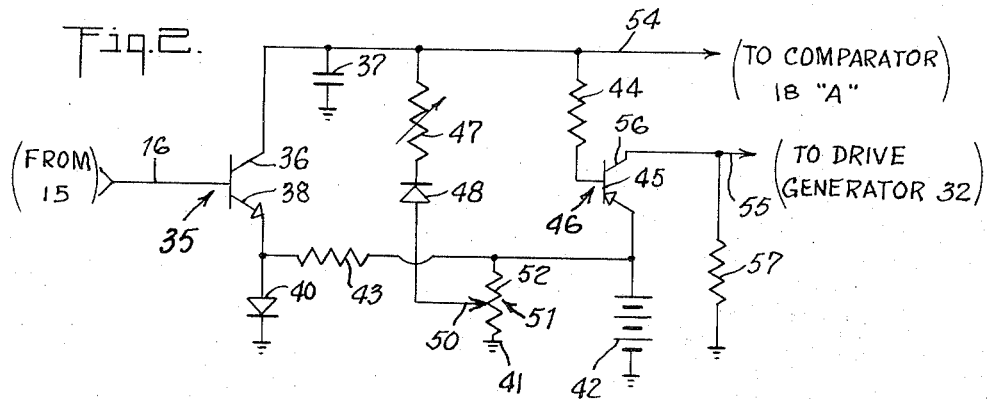
FIG. 2 is a schematic diagram of a ramp generator according to the invention.

Now considering ramp generator 11, reference is made to FIG. 2 in which clamp 17 is depicted as switching transistor 35 with collector electrode 36 connected to ramp capacitor 37 and emitter electrode 38 connected to reference diode 40. Reference diode 40 in turn is connected to the source reference 41 of electrical source 42. Current limiting resistor 43 connects the junction of diode 40 and electrode 38 to the high side of source 42. Current limiting resistor 44 and the base-emitter junction 45 of transistor 46 are connected in series between capacitor 37 and the high side of electrical source 42. Also connected to capacitor 37 is variable resistor 47 connected in series with diode 48 to movable contact 50 of potentiometer 51. Resistive element 52 of potentiometer 51 is connected between reference 41 and the high side of source 42. Output connection 54 is provided from capacitor 37 to input A of comparator 18. Output connection 55 is provided from collector electrode 56 for shut-off connection to drive generator 32. Load resistor 57 is connected between electrode 56 and ground.

The operation of the ramp generator circuit of FIG. 2 commences with charging of capacitor 37 through resistor 44 and base-emitter junction 45 toward the potential of electrical source 42. For example, this may be 10 volts. At some point during the charge time, a tach pulse arrives on line 16 turning on transistor 35. Transistor 35 clamps capacitor 37 to the fixed potential at emitter electrode 38 established by the voltage drop across diode 40. Diode 40 may be several diodes in series or any other element for providing a fixed potential. A voltage somewhat above source reference can be desirable depending on the other connected circuits. The ramp voltage utilized is that reached just before transistor 35 is turned on as established by gate 31.

If a tach pulse doesn't arrive at transistor 35 before capacitor 37 reaches maximum charge, then the forward bias on base emitter junction 45 of transistor 46 falls taking transistor 46 out of conduction so that the potential at output connection 55 falls to source reference. This potential drop at connection 55 then provides a shut-off signal to drive generator 32 so that valve 20 gets shut off.

The slope of the ramp appearing across capacitor 37 is determined by two charging paths. One path is through base-emitter junction 45 and the other is through diode 48. If variable contact 50 of potentiometer 51 is set at source reference 41, then diode 48 will block and the ramp will have a gradual slope determined by the single charge path through base-emitter junction 45. As contact 50 is set closer to source 42, diode 48 conducts and the two charge paths produce a steeper slope for the ramp. The steepness of this slope is variable by varying the resistance of resistor 47. At some point in the charging curve, the charge on capacitor 37 becomes high enough to block diode 48. This shuts off the charging path through diode 48 and produces an abrupt change in the slope of the ramp decreasing the slope angle. The point in the ramp at which this abrupt change in slope occurs is determined by the setting of contact 50.

Thus resistor 47, diode 48 and potentiometer 51 provide a linearity control which serves to provide selectable complex functions for the curve of the ramp. Other resistors and capacitive devices may be utilized in the linearity control or in the charging path through junction 45 to produce various slopes and complex functions.

Figure 3:
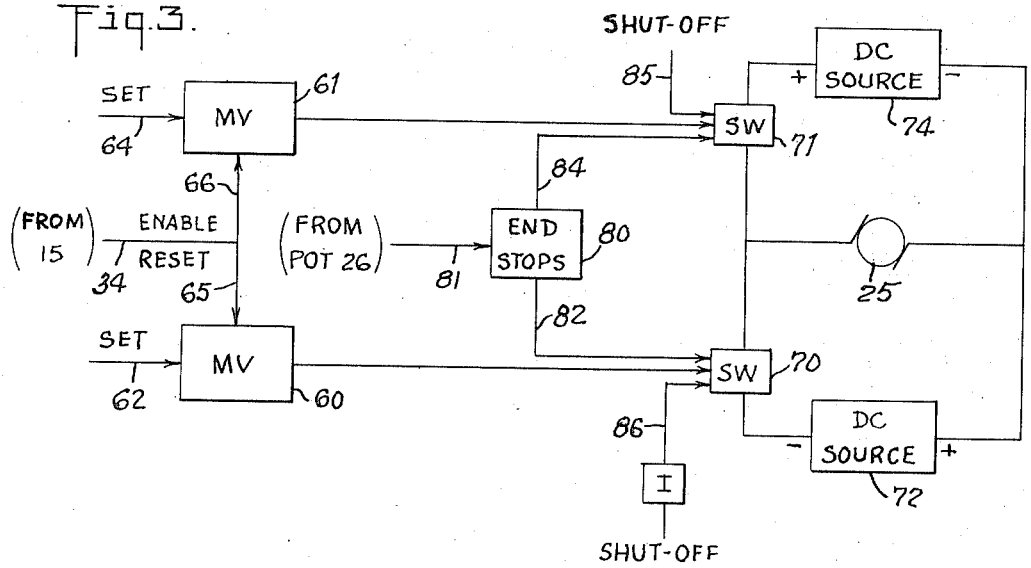
FIG. 3 is a detailed block diagram of motor drive circuits according to the invention.

Gate 31, drive generator 32 and motor 25 may take various forms and an exemplary arrangement is depicted by the block diagram of FIG. 3. FIG. 3 shows two bistable multivibrators, 60 and 61. Multivibrators 60 and 61 each has a "set" input 62 and 64 respectively from comparator 18, an enable reset input 65 and 66 respectively from pulse forming circuit 15 and an output 67 and 68 respectively to switches 70 and 71 respectively. Switch 70 connects DC source 72 of one polarity to motor 25 and switch 71 connects DC source 74 of the opposite polarity to motor 25. DC sources 72 and 74 are depicted as separate sources for ease of description. In an actual system DC sources 72 and 74 are a single source and switches 70 and 71 each comprise a plurality of switches for directing current from the DC source through a winding of motor 74 in one direction or the other as signaled.

Switches for inhibiting motor drive past the limits of potentiometer 26 are indicated as end stops 80 with an input connection 81 from potentiometer 26. End stops 80 has connection 82 to switch 70 and 84 to switch 71 for positively turning off switches 70 and 71 upon encountering the respective end stop of potentiometer 26.

Further, a shut-off connection 85 from ramp generator 11 is provided as an input to switch 71 and an inverted shut-off connection 86 is provided from ramp generator 11 to switch 70. End stops 80 and shut-off 85 and 86 may be brought in at different parts of the circuits of switches 70 and 71 to establish their relative priority. However, isolating diodes and resistors may be used to establish the relative priority and the connections may be made to the same point as is well known in the art.

The operation of the motor drive circuits as depicted in FIG. 3 is controlled by bistable multivibrators 60 and 61. In the reset state, multivibrators 60 and 61 hold switches 70 and 71 in the OFF condition with no power to motor 25. Set inputs 62 and 64 follow the output of comparator 18, but are inhibited from changing the state of the respective multivibrators 60 and 61 in the absence of a tach pulse from circuit 15 as an enabling input. This is suitably accomplished by AND logic at the input of multivibrators 60 and 61. An incoming tach pulse resets multivibrators 60 and 61 by the leading edge of the waveform and then holds the input enabled during the length of the pulse. A set signal from comparator 18 at the input of one of multivibrators 60 and 61 will set the multivibrator turning on the respective one of switches 70 and 71. This state then continues until the next incoming tach pulse.

When multivibrator 60 is set, switch 70 connects DC source 72 to motor 25 causing it to rotate. When multivibrator 61 is set, switch 71 connects DC source 74 to motor 25 causing it to rotate in the reverse direction. End stop signals readily derived from potentiometer 26 positively open switches 70 and 71 to prevent motor 25 from driving valve 20 past full open and full close positions.

The absence of tach pulses causes a shut-off signal to issue from ramp generator 11 providing shut-off inputs to switches 70 and 71. The shut-off signal is applied to switch 71 to open switch 71 irrespective of the signal from multivibrator 61. The shut-off signal is applied to switch 70 after inverting to close switch 70 and drive valve 20 to the closed position irrespective of the signal from multivibrator 60. As soon as valve 20 reaches the fully closed position, an end stop signal is provided from end stops 80 responsive to the position of potentiometer 26, opening switch 70 irrespective of either of the shut-off or multivibrator inputs.

Operation in a salt-dispersing road truck begins with the truck stopped and valve 20 off so that no salt is fed to the dispersing unit. When the control circuit of the invention is activated the shut-off signal from ramp generator 11 holds valve 20 off. As soon as the truck starts moving, the first tach pulse dumps the ramp capacitor and a comparison is made at the time of the next tach pulse. At slow speeds the ramp is being sampled in a portion having a small slope angle and valve 20 will be opened a substantial amount immediately and will open more very gradually relative to speed increase. This results in a relatively heavy salt distribution at extremely low speeds with a decrease in distribution density as the speed increases. When the tach pulse reaches a rep rate that causes comparisons in the large slope angle portion of the ramp, then the salt dispersal will normally be set to increase proportional to speed increase as determined by the setting of the linearity controls.

While the invention has been described with particular relation to salt, sand and fertilizer dispersal, it is to be understood that it is readily adaptable for various other uses in which a control signal is derived from the speed of a rotating shaft relative to the rotational position of a control shaft. Thus it is intended to claim the invention broadly within the spirit and scope of the appended claims.

We claim:

1. An electrical circuit comprising means to position a control device responsive to a tachometer in which said means to position comprises:
   a. First signal means connected to receive the output of said tachometer and provide a ramp voltage as a function of said output;
   b. second signal means connected to said control device to detect the operative position thereof and provide a second signal as a function of said position;
   c. comparator means connected to said first signal means and said second signal means for comparing said first signal and said second signal and providing an output signal as a result of said comparing; and,
   d. drive means connected to said comparator means to receive said output signal and position said control device responsive to said output signal, the output of said tachometer being a train of pulses and said first signal means comprising a ramp generator for generating a ramp voltage and a switching circuit connected to said ramp generator, said switching circuit connected to receive the output pulses of said tachometer and responsive to said pulses for resetting said ramp voltage to a reference level.

2. An electrical circuit according to claim 1 wherein said ramp generator is connected to said comparator to provide said first signal to said comparator and said electrical circuit further comprises means to enable said first signal to affect said drive means only at substantial peaks of said ramp voltage.

3. An electrical circuit according to claim 1 wherein said ramp generator comprises linearity controls whereby the curve of said ramp voltage can be adjusted to provide complex wave forms.

4. An electrical circuit according to claim 1 wherein said ramp generator comprises a capacitor and plural charging paths for said capacitor, at least one of said charging paths having a discontinuous charging characteristic.

5. A spread rate controller for controlling distribution of material from a moving vehicle comprising a control device and means responsive to the speed of the vehicle for positioning said control device comprising:
   a. A tachometer connected to a drive shaft of said vehicle for generating a train of pulses;
   b. a position sensor connected to said control device for providing a first signal as a function of the position of said control device;
   c. electrical circuit means connected to said tachometer for providing a second signal as a function of the repetition rate of said pulses;
   d. a comparator connected to said position sensor and said electrical circuit means so as to compare said first signal and said second signal and provide an output as a function of the comparison; and,
   e. drive means connected to said comparator and to said control device for changing the operative position of said control device responsive to the output of said comparator, said electrical circuit means comprising linearity control for providing complex functions to the generation of said second signal whereby spread rate is provided disproportionate to vehicle speed over a first speed range and proportionate to speed over a second speed range.

6. A spread rate controller for controlling distribution of material from a moving vehicle comprising a control device and means responsive to the speed of the vehicle for positioning said control device comprising:
   a. A tachometer connected to a drive shaft of said vehicle for generating a train of pulses;
   b. a position sensor connected to said control device for providing a first signal as a function of the position of said control device;
   c. electrical circuit means connected to said tachometer for providing a second signal as a function of the repetition rate of said pulses;
   d. a comparator connected to said position sensor and said electrical circuit means so as to compare said first signal and said second signal and provide an output as a function of the comparison; and,
   e. drive means connected to said comparator and to said control device for changing the operative position of said control device responsive to the output of said comparator, said electrical circuit means being further connected to said drive means and said drive means comprising switching circuits for changing drive to said control device only upon one of said train of pulses.

7. A spread rate controller according to claim 6 wherein said electrical circuit means comprises means to detect an absence of said train of pulses, and to provide an override signal to said drive means to drive said control device to an "OFF" position.

* * * * *